United States Patent Office 3,213,800
Patented Oct. 26, 1965

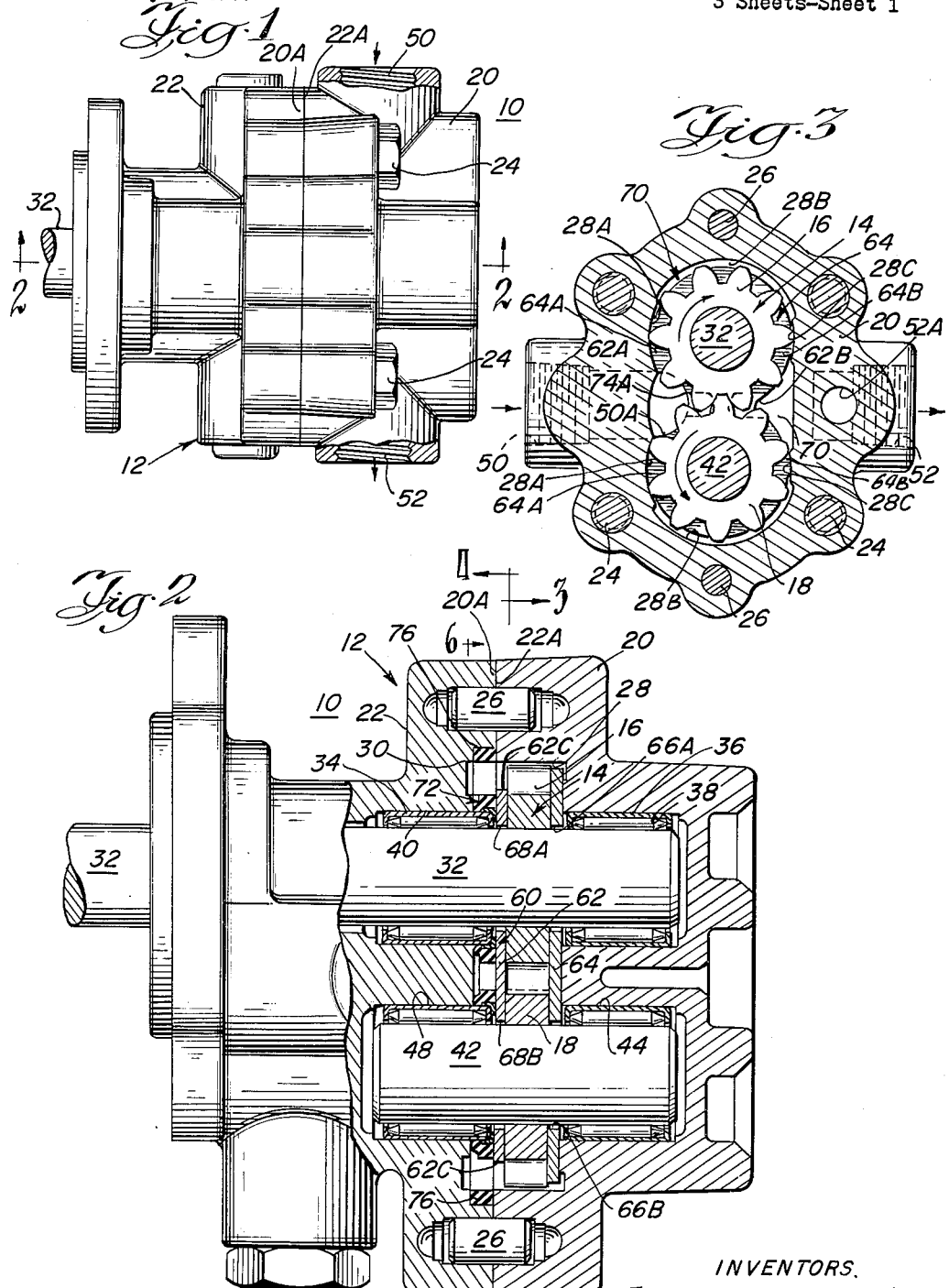

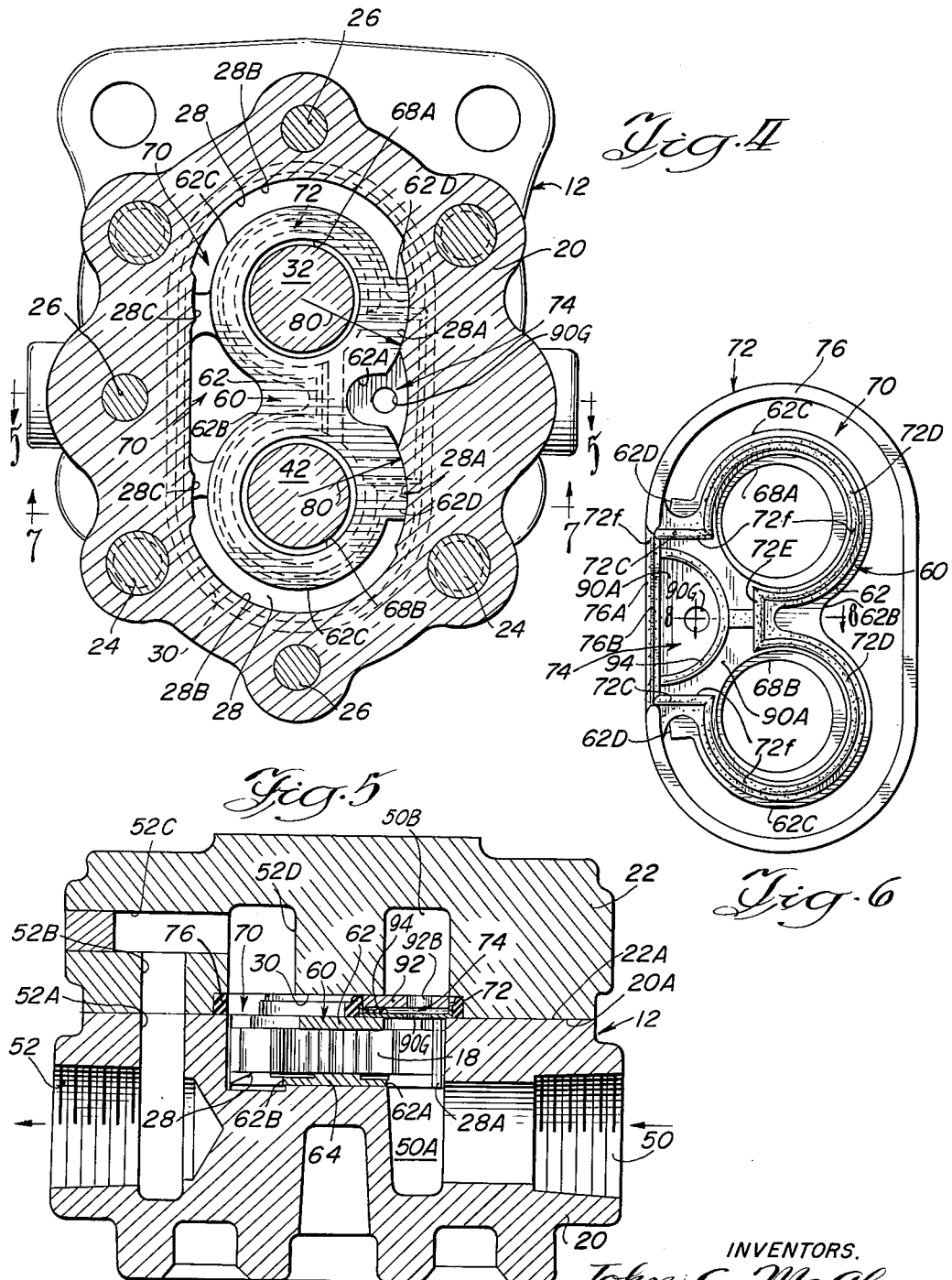

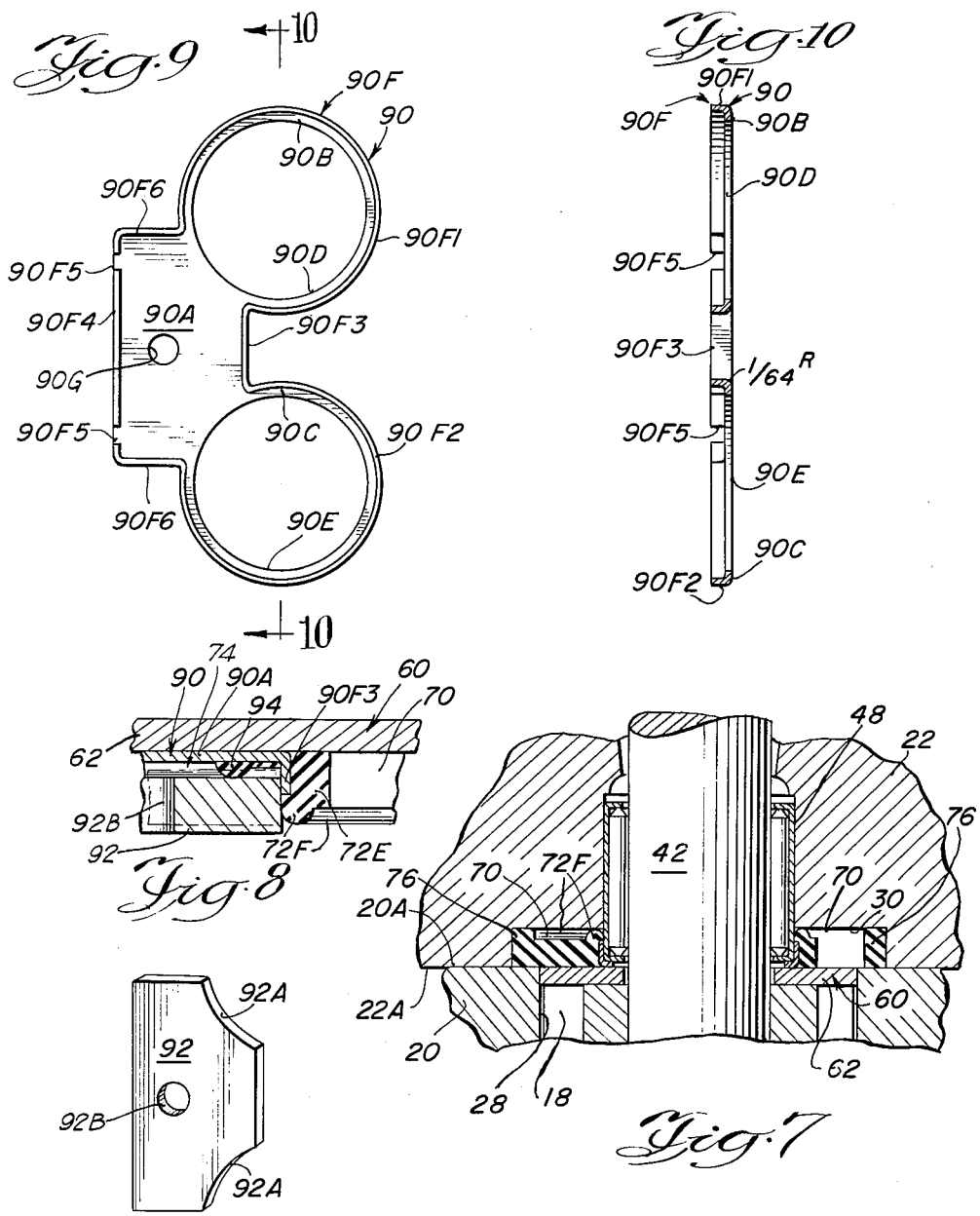

3,213,800
UNITARY WEAR PLATE AND SEAL
John C. McAlvay and Robert E. Trick, Racine, Wis., assignors to Webster Electric Company, Racine, Wis., a corporation of Delaware
Filed May 4, 1965, Ser. No. 453,050
18 Claims. (Cl. 103—126)

Numerous methods of applying "pressure loading" or "pressure balancing" to gear pumps have been devised. All have the purpose of adjusting the end clearance of the gears to reduce slippage at high pressure, and the various schemes are successful in varying degrees.

Early efforts in this field generally used "O" rings or special section sealing bands in rather elementary configurations, and gradually evolved into more scientific arrangements as the pressure requirements were elevated. The accomplishments in these developments are indicated by the fact that fixed clearance pumps of most varieties were typically limited to the range of 300 to 750 p.s.i. at the time of introduction of the first pressure loaded pumps, and have never progressed to the point of being satisfactory for pressures much in excess of 1500 p.s.i. (with isolated exceptions). In contrast, even very early pressure loaded pumps gave initially high efficiencies at 2000 p.s.i., and it is not now unusual to obtain and maintain efficiencies near 95% (volumetric) at 2500 to 3000 p.s.i. even after several thousand hours of use.

The greatest changes in the latter part of the development were directed to obtaining even distribution of the sealing forces, thus reducing the unnecessary wear of highly loaded regions, but still assuring the necessary forces to prevent slip losses. This goal demands rather complex seal shapes, which in most cases demand cumbersome assembly operations in properly placing the seal parts.

Attainment of higher pressures and the requirement for high reliability at these pressures, both in continuous operation and with cyclic pressure variations, have set up new requirements for seal performance, and is particularly rigorous in requiring thorough study of clearances to assure that the elastomeric seal materials are not extruded through some tiny opening at each pressure cycle and thus abraded at the edge of this opening on each relaxation of pressure.

We have learned that at and above 2000 p.s.i. the design of the elastomeric seal parts should be approached by considering them to be made from a very viscous fluid, and all clearances treated as potential leaks. Using this technique, anti-extrusion members must be looked upon as seals to prevent leakage of the elastomer. Of course, the extent to which it is necessary to refine these seals is very much less than with seals for usual hydraulic fluids, but the approach permits clear visualization of design requirements.

An apparent inconsistency in this analysis lies in the effect of bonding or welding a rubber seal to (for instance) a wear plate, in which case the resistance to extrusion is not just the reluctance of the rubber to assume a new sectional shape, but the shear or tear strength of the bond. This device is used in such designs as the one disclosed in the Robert E. Trick application Serial No. 451,094, filed April 16, 1965, as a continuation of the now abandoned application Serial No. 247,174, filed December 26, 1962, both assigned to the assignee of this application.

In the present invention in its most specific aspects advantage is taken of the added strength of the bonding but extends the principles to include the bonding of an anti-extrusion stamping into the same unit which combines the wear plate and seal in the Trick application. By this means, the strength of the bonding vastly improves the effectiveness of the anti-extrusion means not only in its ability to prevent rubber flow into unwanted regions, but also in its outright reinforcing action. However, the invention, in its broader aspects, contemplates arrangements in which the wear plate, sealing means and anti-extrusion element may be separate, i.e., not bonded or otherwise secured to each other to form a unitary assembly.

It is thus an object of the present invention to provide a new and improved high pressure hydraulic unit of the rotary type including new and improved sealing means for reducing slippage at high pressures.

A further object of the present invention is to provide a new and improved wear plate—sealing gasket assembly for use in pressure loaded hydraulic devices.

A still further object of the present invention is to provide a unitary wear plate sealing gasket assembly including a wear plate, a sealing gasket, and an anti-extrusion member associated with the gasket for preventing undesired extrusion and abrasion of the latter.

Another object of the present invention is to provide an assembly as set forth in the preceding paragraph in which the anti-extrusion member includes a short axially extending flange encircled by the gasket material and constructed and arranged to be deformable or bendable under fluid pressure to provide enhanced sealing with respect to associated pump parts, thereby more effectively to prevent extrusion of the sealing means.

In brief, the present invention provides a rotary hydraulic unit, such as a gear pump, that operates efficiently at high pressures. The pump may take the form of a gear pump having a housing defining a gear chamber in which are located a pair of intermeshing gears constituting impeller means. The pump may include a fixed wear plate means and an axially movable wear plate means, such as a plate mounted in the chamber and one side of which abuts the gears and the second side is open to a pressure chamber. The second side has abutting against it unitary and integral sealing means or gasket encircling the wear plate and the major portion of the gear supporting shafts and means such as the bearing means supporting the shafts and dividing the pressure chamber into two areas, one subjected to high, such as discharge pressure and the other to inlet pressure. These areas are so located as to force or bias the wear plate axially against the gears at a variable pressure corresponding to the discharge pressure, and thus to maintain the wear plate against the gears to prevent leakage at high pressures without undue binding. The wear plate is also forced or biased toward the inlet side of the pressure chamber by discharge pressure so as to provide adequate sealing of the pump inlet. The sealing means is eccentrically located relative to the bearing means initially to bias the wear plate toward the inlet. The wear plate and sealing means may be, and preferably is, constructed as a unitary assembly with anti-extrusion means for the sealing means. The anti-extrusion means has a configuration corresponding to a portion of the sealing means surrounding the bearing means and utilized in defining high and low pressure areas back of the wear plate and utilized to force the wear plate against the gears. The anti-extrusion means is constituted by a metallic element having a flat panel-like portion over the low pressure area and having an upstanding and somewhat bendable flange encircled by the gasket material which is bonded to the wear plate and to the anti-extrusion member. The flange portion is at the low pressure side of the sealing means and it is overlain by a bead portion of the sealing means. The anti-extrusion means and a filler plate cooperating with the latter may be provided with openings to insure that the low pressure region back of the wear plate communicates with the low pressure region of the pump.

Further objects and advantages of the present invention will become apparent from the ensuing description of an illustrative embodiment of the invention, in the course of which reference will be had to the accompanying drawings, in which:

FIG. 1 is an elevational view of a rotary hydraulic unit, illustrated as a gear pump, constructed in accordance with the present invention;

FIG. 2 is an enlarged axial fragmentary cross sectional view of the pump, the view being taken along the line 2—2 of FIG. 1;

FIG. 3 is a transverse cross sectional view, on a reduced scale, taken along the line 3—3 of FIG. 2;

FIG. 4 is a transverse cross sectional view taken along the line 4—4 of FIG. 2;

FIG. 5 is a transverse cross sectional view taken along line 5—5 of FIG. 4;

FIG. 6 is an elevational view of the pressure chamber side of the wear plate-gasket assembly of the present invention, the view corresponding to one along the line 6—6 of FIG. 2 but with a filler plate omitted;

FIG. 7 is an enlarged fragmentary cross sectional view along the line 7—7 of FIG. 4;

FIG. 8 is an enlarged fragmentary cross sectional view along the line 5—5 of FIG. 4 (also along line 8—8 of FIG. 4) and with the purp gears removed to illustrate further what is shown in FIG. 5;

FIG. 9 is a plan view of the anti-extrusion plate or stamping forming part of the present invention;

FIG. 10 is a cross sectional view along the line 10—10 of FIG. 9; and

FIG. 11 is a perspective view of a filler plate associated with the wear plate sealing means.

Referring now to the drawings, the rotary hydraulic unit of the present invention is indicated as a whole by reference character 10. It is shown as a gear pump including a housing 12 and impeller means 14 taking the form of intermeshing driving and idler gears 16 and 18.

The pump housing 12 includes opposed sections 20 and 22 having meeting faces 20A and 22A and held in assembled relation by a plurality of bolts 24 and accurately located relative to each other by dowels 26. A pumping chamber 28 is formed at face 20A of housing section 20 and a pressure chamber 30 is similarly formed in section 22. The pumping chamber has a somewhat "8"-shaped configuration.

Pump gear 16 is rotated by a drive shaft 32 journalled for rotation in stationary structure such as the axially spaced apart bearing means 34 and 36 mounted in counterbore 38 in section 20 and opening 40 in section 22, respectively. Bearing means 36 has an outer race or shell that projects into pressure chamber 30, as may be noted from FIG. 2, for cooperation with the unitary wear plate and seal assembly of the present invention, as will be described later. The idler pump gear 18 is driven by gear 16. Gear 18 is mounted on shaft 42 and the latter is journalled on bearing means 44 and 48 in housing sections 20 and 22, respectively, and of which the outer race of bearing means 48 projects into pressure chamber 30, as shown in FIGS. 2 and 7. The gears may be made integral with their shafts or otherwise suitably secured thereto.

The pump is illustrated with an inlet 50 and an outlet 52, both in housing section 20. Inlet 50 communicates with the pump chamber 28 through passageway 50A. Outlet 52 communicates with the discharge side of the pump chamber 28 through passages 52A, 52B, 52C and 52D. Passages 50A and 52D lead to the inlet and outlet sides of the gears, the latter lying on a line passing through the axes of rotation of the gears, as best shown in FIG. 3, and with the gears rotating in the direction of the arrows in this figure.

In order to provide the axial loading of the present invention, the pump is provided with fluid pressure actuated wear plate means 60 acting axially on at least one side of the gears. In the present instance one such means is utilized, it being in the form of a wear plate 62 acting on the left side of gears 16 and 18, as viewed in FIG. 2. A wear plate 64 is shown at the right sides of the gears, it being at what might be termed the back side of pumping chamber 28 where it is relatvely fixedly held and located by a close fit between its relatively short peripheral portions 64A and 64B and the adjacent side walls of the pressure chamber (see FIG. 3). The plate 64 is apertured at 66A and 66B with substantial clearance for the gear shafts 32 and 42. This plate is also inset somewhat inbetween the peripheral projections and cut away at the regions of the inlet and outlet passage portions 50A and 52D to give it a somewhat "8"-shaped configuration. It should be noted that the fixed or "dead" wear plate 64 need not be used, as the gears could instead bear against the pump housing. Also, two pressure loaded wear plates could be used.

The axially movable wear plate 62 has a modified figure "8" configuration that is best illustrated in FIGS. 4 and 6. It is apertured at 68A and 68B with substantial clearance for the passage of shafts 32 and 42 and it is axially movable in the pumping chamber 28. It, too, is cut away at the region of the inlet and outlet to the pumping chamber, as indicated by reference characters 62A and 62B. It includes upper and lower portions that are identical and encircle shafts 32 and 42.

A reduction in bearing loading and shaft deflection is provided by radial balancing means applying a uniform pressure, such as discharge pressure, over a considerable angular extent of each of the gears. To accomplish this, the wear plate 62 is provided with inset portions 62C extending from the outlet cut away portion 62B in opposite directions toward the inlet portion 62A and up to plate portions 62D which project radially to abut against sealing surfaces 28A provided in the pumping chamber at opposite sides of the inlet. Also, the pumping chamber is relieved around considerable angular portions of the gears at opposite ends of the chamber, as indicated by reference character 28B. This relieving provides short angular pumping chamber portions 28C abutting the gears near the outlet but these portions need not be used. Actually, they provide no sealing and are used only for measurement purposes during construction. They have an arcuate extent such that they do not seal from gear tooth to tooth. They also provide chamber surfaces opposite plate portions 64B. It should be noted that the relieved portions 28B have a considerable angular extent as do the cut away portions 62C. Cutting the wear plate away also contributes to a reduction in friction losses. The wear plate is not only cut over a considerable angular extent, but is it cut substantially to the roots of the gears as may best be noted from FIG. 2. Accordingly, the torque necessary to drive the pump during operation is reduced.

The wear plate 62 is biased axially against the gears by high pressure fluid, specifically fluid at discharge pressure. This is accomplished by placing pressure chamber 30 in communication with the discharge passage 52, this being done through passage portion 52D and the inset portions 62B and 62C of the wear plate. The discharge pressure is limited to a first and generally E-shaped high pressure area or region 70 of the pressure chamber which is generally E-shaped and generally coextensive with portions 62B and 62C of the wear plate. This is accomplished through resilient sealing means, such as the gasket indicated generally by reference character 72 in cooperation with the bearing cages 36 and 48. This arrangement also provides a second and low pressure region 74 that is subject to inlet pressure through cut away portion 62A of the wear plate 62. The connection of region 74 to inlet pressure is also insured by an opening 90G in an anti-extrusion stamping 90 described at length hereinafter.

The resilient sealing means 72, which is specifically shown as bonded to the wear plate, includes a peripheral generally elliptical portion 76, and is for the most part of generally rectangular cross section, encircling in spaced relation the wear plate 62 and which fits into the pressure chamber 30 and seals portions of both pressure regions 70 and 74. The peripheral portion 76A of the gasket is not rectangular in section as it is provided with an upwardly extending rounded bead 76B overlying a portion of a hereafter described anti-extrusion stamping 90. While encircling the wear plate 62, the sealing means is disposed to one side of the plate and is compressed betweene housing sections 20 and 22, thereby effectively sealing the pressure chambers.

The sealing means 72 includes further integral straight transverse portions 72C extending inwardly to generally C-shaped portions 72D encircling the major portions of the peripheries of the bearing means 36 and 48 and another short straight portion 72E connecting the adjacent ends of the portions 72D.

The high pressure region 70 is thus defined by the portions 76, 76C, 72D and 72E of the sealing means 72. The high pressure is thus applied over about 270° of the peripheries of the gears 16 and 18 to provide the radial balancing, as well as forcing of the gears in directions indicated by the converging arrows, see FIG. 4. The forces acting in these directions are minimized by reason of the fact that, in large part, the forces acting on the gears are equal and opposite. The resulting forces, indicated by reference character 80 in FIG. 4, also bias the gears against the pump chamber surfaces 28D, whereby the high pressures in the pump are effectively sealed from the low pressures.

The wear plate is also biased by the pump discharge pressure acting upon peripheral regions of the plate in pressure chamber 70 toward the inlet to effect sealing engagement between the wear plate regions 62C against surfaces 28D. Leakage is accordingly effectively prevented.

To prevent leakage initially as the pump is started, the wear plate may be mechanically and resiliently radially biased against the pump chamber. This can be done by locating the circular sealing means portions 72D eccentrically relative to the bearing means 36 and 48, so that portions 72D of the sealing means force the wear plate toward the inlet, as specifically disclosed and claimed in the copending Trick application heretofore referred to.

The abutting wear plate surfaces 62D and housing surfaces 28A are resiliently held in sealing engagement so that the pump will initially operate satisfactorily as the pump pressure builds up, the wear plate is forced to the left to provide additional sealing at the abutting surfaces. The plate is forced to the left as a result of discharge pressure acting at the peripheral edge of wear plate 62 at its inset portion 62C. Accordingly, leakage of fluid from inlet to outlet is effectively prevented.

The low pressure region 74 is defined by portions of the bearing means 36 and 48 that are not encircled by sealing means, a straight portion 76A of the peripheral sealing means 76 and the straight portions 72C and 72E of sealing means. This region is open to inlet pressure through the cut away portion 62A of plate 62.

In accordance with the present invention the unitary plate and seal arrangement includes an anti-extrusion stamping of pan-like configuration, indicated as a whole by reference character 90 and best illustrated in FIGS. 7 through 10. This anti-extrusion stamping considerably reinforces the seal and minimizes possible shearing and abrading of the seal under high pressures. The stamping includes a somewhat rectangular platelike portion 90A overlying the low pressure region 74 and a pair of generally C-shaped portions 90B and 90C defining apertures 90D and 90E through which the pump shafts extend. The stamping 90 is provided with a short axially extending peripheral upstanding and slightly bendable or deformable flange 90F including C-shaped portions 90F1 and 90F2 connected by a short transverse portion 90F3 and by a portion 90F4 at the outside of the platelike portion 90A and which is provided with a couple of slots or cuts 90F5, whereby the sealing gasket is better secured to it. Portion 90F4 is connected by short straight portions 90F6 to the C-shaped portions.

The stamping is made of steel having a thickness of about .025 inch. The junction of the flange and base portion is formed with a radius of 1/64 inch maximum, as indicated in FIG. 10, in order that the flange may somewhat more readily be bent under fluid pressure.

The resilient gasket 72 may be and is shown bonded to both the anti-extrusion stamping 90 and to the wear plate 60. Gasket portions 72C, 72D and 72E encircle the exterior portions of the peripheral flange 90F of the stamping and the gasket is provided with a relatively narrow and rounded bead 72F overlying and extending beyond the end of the flange for engagement with the housing 22, as best illustrated in FIGS. 7 and 8 so that the stamping will not interfere with the effective sealing provided by the resilient gasket and to provide mechanical initial axial loading of the wear plate. The innersides of the C-shaped flange portions 90F1 and 90F2 closely encircle the cages of bearings 34 and 48 and they are substantially free of the gasket material and closely encircle the bearing cages, as best illustrated in FIGS. 2 and 7. Also, the portions 90B and 90C of the stamping 90 at flange portions engage the ends of the bearing cages.

From FIGS. 2, 7 and 8 it will be apparent that extrusion of the gasket material into the spaces between the wear plate 60 and the bearing cages is effectively prevented by the anti-extrusion stamping. The stamping also prevents other undesired extrusion of the gasket, as around the periphery of the low pressure area 74 where additional means are provided for preventing extrusion, which means takes the form of a filler plate 92, illustrated in its entirety in FIG. 11 and supported upon a generally semi-circular resilient rib 94 provided in the bottom portion 90A of the stamping. The rib 94 is also bonded to the stamping 90 and forms part of the unitary assembly in view of the fact that the stamping is secured to the wear plate 60 by the gasket material. Further, the rib 94, through the filler plate, serves resiliently initially to bias the wear plate axially against the gears, thus assisting the gasket 72 in this respect. In order to insure that inlet pressure is available at the low pressure region 74, the filler plate is provided with an opening 92B and stamping 90 is provided with an opening 90G. Also, the body chamber 50B opposite passageway 50A may communicate with a low pressure region. The opening 92B in the filler plate prevents the formation of a trap pocket between the plate and seal portion 94.

In construction of the pump, the housing sections and gears and their supporting shafts may be made in conventional manner. The fixed or dead wear plate 64 is inserted into the housing section 20, where it is located between one side of the gears and the housing. The pressure loaded end plate 62 is constructed as a unit with the sealing means 72 and the anti-extrusion stamping, these being bonded together. Thereafter, the filler plate 92 is inserted into the low pressure region where it engages the seal portions 72C and 72E of the gasket, part of the peripheral portion 76 of the sealing means and the arcuate portions 92A engage the bearing cages 40 and 48. Under high pressure conditions these arcuate portions are forced against the bearing cages by the fluid pressure. The gasket also is compressed to bend the flange portion 90F4 of the stamping to move filler plate 92 against the bearing cages. The wear plate—sealing means is then assembled at the second side of the gear plate, where it is peripherally held between the housing sections 20 and 22 with the portion 76 providing sealing against external leakage between the two sections. The sealing means also provides the high pressure area 70 and the second and low pressure area 74. The high pressure area is in communication with the gears by virtue of the inset portion 62C in the wear plate, whereby the latter is radially biased by the fluid pressure acting on the edge of the wear plate and also on the high pressure sides of portions 72D and 72E of the gasket which are bonded to the wear plate. The insetting of the wear plate and the spacing 28B around the peripheries of the gear teeth and housing reduce the friction losses. The end plate 62 is also axially biased against the sides of the gears, initially by the gasket and during operation also by the fluid pressure acting on the sides of the exposed portion of the plate beyond the sealing portions 72C, 72D and 72E. Initially, the wear plate is also biased radially to maintain the wear plate portion 62C in sealing engagement with the housing portions 28A by the eccentric location of the sealing portions 72D relative to the bearing means 40 and 48. Accordingly, the pump is provided with both radial and end loading and the described construction has been found to be very effective with high pressures such as in the range of 2500 to 3000 p.s.i. and higher.

While the present invention has been described in connection with the details of an illustrative embodiment thereof, it should be understood that these details are not intended to be limitative of the invention except insofar as set forth in the accompanying claims.

What is claimed as new and desired to be secured by Letters Patent of the United States is:

1. A wear plate—sealing assembly for end loading bearing means supported impeller means of a hydraulic machine comprising a wear plate adapted movably to abut against the impeller means, resilient sealing means bonded to a side of the wear plate opposite the impeller means to facilitate manufacture of the assembly and adapted to define with a structure of the machine high and low pressure regions, and including portions at least partially encircling the bearing means and an anti-extrusion stamping resiliently secured in abutting relation to the wear plate by the sealing means and including short axially extending portions at least partially and closely encircling the bearing means at the low pressure side of the sealing means.

2. A wear plate—sealing arrangement for end loading bearing means supported impeller means of a hydraulic machine comprising a wear plate adapted movably to abut against the impeller means, resilient sealing means bonded to a side of the wear plate opposite the impeller means to facilitate manufacture of the assembly and adapted to define with a structure of the machine high and low pressure regions, and including portions at least partially encircling the bearing means and an anti-extrusion stamping abutting against the said opposite side of the wear plate and including short axially extending portions at the low pressure side of the sealing means and at least partially and closely encircling the bearing means.

3. A wear plate—sealing arrangement for end loading bearing means supported impeller means of a hydraulic machine comprising a wear plate adapted movably to abut against the impeller means, resilient sealing means at the side of the wear plate opposite the impeller means to facilitate manufacture of the assembly and adapted to define with a structure of the machine high and low pressure regions and including portions at least partially encircling the bearing means and an anti-extrusion stamping abutting against the said opposite side of the wear plate and including short axially extending portions at least partially and closely encircling and abuttable against the bearing means at the low pressure side of the sealing means.

4. A wear plate—sealing arrangement for end loading bearing means supported impeller means of a hydraulic machine comprising a wear plate adapted movably to abut against the impeller means, resilient sealing means at the side of the wear plate opposite the impeller means to facilitate manufacture of the assembly and adapted to define with a structure of the machine high and low pressure regions and including portions at least partially encircling the bearing means and an anti-extrusion stamping abutting against the said opposite side of the wear plate and including short axially extending portions at least partially and closely encircling and abuttable against the bearing means at the low pressure side of the sealing means, said stamping also including a flat plate-like portion substantially overlying the low pressure region.

5. A wear plate—sealing arrangement for end loading bearing means supported impeller means of a hydraulic machine comprising a wear plate adapted movably to abut against the impeller means, resilient sealing means at the side of the wear plate opposite the impeller means to facilitate manufacture of the assembly and adapted to define with a structure of the machine high and low pressure regions and including portions at least partially encircling the bearing means and a peripherally flanged anti-extrusion stamping abutting against the said opposite side of the wear plate with the flanged portion facing away from the wear plate and including portions at least partially and closely encircling and abuttable against the bearing means at the low pressure side of the sealing means, said stamping including also a flat plate-like portion substantially overlying the low pressure region, and said sealing means including a beaded portion overlying the flange.

6. A wear plate—sealing assembly for end loading bearing means supported impeller means of a hydraulic machine comprising a wear plate adapted movably to abut against the impeller means, sealing means bonded to a side of the wear plate opposite the impeller means to facilitate manufacture of the assembly and adapted to define with a structure of the machine high and low pressure regions, and including portions at least partially encircling the bearing means, and an anti-extrusion stamping secured to the wear plate and including short somewhat bendable axially extending portions at least partially encircling the bearing means.

7. A wear plate—sealing assembly for end loading bearing means supported impeller means of a hydraulic machine comprising a wear plate adapted movably to abut against the impeller means, sealing means bonded to a side of the wear plate opposite the impeller means to facilitate manufacture of the assembly and adapted to define with a structure of the machine high and low pressure regions, and including portions at least partially encircling the bearing means, and an anti-extrusion stamping secured to the wear plate by said sealing means and including short axially extending flange-like portions at least partially and closely peripherally encircling the bearing means and having portions engaging ends of the bearing means.

8. A wear plate—sealing arrangement for end loading bearing means supported impeller means of a hydraulic machine comprising a wear plate adapted movably to abut against the impeller means, sealing means at a side of the wear plate opposite the impeller means to facilitate manufacture of the assembly and adapted to define with a structure of the machine high and low pressure regions, and including portions at least partially encircling the bearing means, and an anti-extrusion stamping associated with said sealing means and including short axially extending flange-like portions at least partially and closely peripherally encircling the bearing means and having portions engaging ends of the bearing means.

9. A wear plate—sealing assembly for end loading bearing means supported impeller means of a hydraulic machine comprising a wear plate adapted movably to abut against the impeller means, sealing means bonded to a side of the wear plate opposite the impeller means to facilitate manufacture of the assembly and adapted to define with a structure of the machine high and low pressure regions, and including portions at least partially encircling the bearing means and an anti-extrusion stamping secured to the wear plate by said sealing means and including short axially extending flange-like portions at least partially and closely peripherally encircling the bearing means and portions engaging ends of the bearing means, the sealing means also including a bead overlying the end of the flange-like portion remote from the wear plate.

10. A wear plate—sealing assembly for end loading bearing means supported impeller means for a hydraulic machine comprising a wear plate adapted movably to abut against the impeller means, sealing means bonded to a side of the wear plate opposite the impeller means to facilitate manufacture of the assembly and adapted to define with a structure of the machine high and low pressure regions, and including portions at least partially encircling the bearing means, and an anti-extrusion stamping resiliently secured to the wear plate at the low pressure side of the sealing means.

11. A wear plate—sealing arrangement for end loading bearing means supported impeller means for a hydraulic machine comprising a wear plate adapted movably to abut against the impeller means, sealing means at a side of the wear plate opposite the impeller means to facilitate manufacture of the assembly and adapted to define with a structure of the machine high and low pressure regions, and including portions at least partially encircling the bearing means, and an anti-extrusion stamping secured to the wear plate and having a peripheral flange overlying the low pressure region and located at the low pressure side of the sealing means.

12. A wear plate—sealing arrangement for end loading bearing means supported impeller means for a hydraulic machine comprising a wear plate adapted movably to abut against the impeller means, sealing means at the side of the wear plate opposite the impeller means to facilitate manufacture of the assembly and adapted to define with a structure of the machine high and low pressure regions, and including portions at least partially encircling the bearing means, and an anti-extrusion metallic stamping adjacent the wear plate and preventing extrusion of the sealing means at the region of the bearing means.

13. A wear plate—sealing assembly for end loading bearing means supported impeller means for a hydraulic machine comprising a wear plate adapted movably to abut against the impeller means, sealing means bonded to a side of the wear plate opposite the impeller means to facilitate manufacture of the assembly and adapted to define with a structure of the machine high and low pressure regions, and including portions at least partially encircling the bearing means and an anti-extrusion stamping adjacent the wear plate and preventing extrusion of the sealing means at the region of the bearing means.

14. A wear plate—sealing assembly for end loading bearing means supported impeller means for a hydraulic machine comprising a wear plate adapted movably to abut against the impeller means, sealing means bonded to a side of the wear plate opposite the impeller means to facilitate manufacture of the assembly and adapted to define with a structure of the machine high and low pressure regions, and including portions at least partially encircling the bearing means and an anti-extrusion stamping secured to and abutting against the wear plate and including short axially extending portions at least partially and closely encircling the bearing means and substantially free of the sealing means material at the encircling side and region.

15. In a rotary hydraulic machine, gear type impeller means, spaced shafts supporting the impeller means, a multi-part housing for said impeller means, bearing means in the housing for supporting said shafts, movable wear plate means for end loading the impeller means and having a first side movably abutting against said first side of said impeller means and a second side spaced from and facing the housing, means including a fluid pressure chamber at the second side of said plate for effecting movement of the wear plate means relative to the impeller means, means including resilient sealing means at the second side of said plate providing high and low pressure areas at the second side of said plate and providing also sealing between the housing parts, passage means connecting said high and low pressure areas to high and low pressure regions, respectively, of said impeller means, an anti-extrusion element having a configuration corresponding generally to that portion of the sealing means dividing the high and low pressure regions and including a plate-like portion over the low pressure region and a short axially extending flange portion of the aforesaid configuration disposed at the low pressure side of the sealing means, said sealing means being bonded to said wear plate means and anti-extrusion element whereby said wear plate means, sealing means and anti-extrusion element are formed into a unitary assembly.

16. In a rotary hydraulic machine, gear type impeller means, spaced shafts supporting the impeller means, a multi-part housing for said impeller means, bearing means in the housing for supporting said shafts, movable wear plate means for end loading the impeller means and having a first side movably abutting against said first side of said impeller means and a second side spaced from and facing the housing, means including a fluid pressure chamber at the second side of said plate for effecting movement of the wear plate means relative to the impeller means, means including resilient sealing means at the second side of said plate providing high and low pressure areas at the second side of said plate and providing also sealing between the housing parts, passage means connecting said high and low pressure areas to high and low pressure regions, respectively, of said impeller means, an anti-extrusion element having a configuration corresponding generally to that portion of the sealing means dividing the high and low pressure regions and including a plate-like portion over the low pressure region and a short axially extending flange portion of the aforesaid configuration disposed at the low pressure side of the sealing means and including portions closely encircling portions of the bearing means.

17. In a rotary hydraulic machine, gear type impeller means, spaced shafts supporting the impeller means, a multi-part housing for said impeller means, bearing means in the housing for supporting said shafts, movable wear plate means for end loading the impeller means and having a first side movably abutting against said first side of said impeller means and a second side spaced from and facing the housing, means including a fluid pressure chamber at the second side of said plate for effecting movement of the wear plate means relative to the impeller means, means including resilient sealing means at the second side of said plate providing high and low pressure areas at the second side of said plate and providing also sealing between the housing parts, passage means connecting said high and low pressure areas to high and low pressure regions, respectively, of said impeller means, an anti-extrusion element having a configuration corresponding generally to that portion of the sealing means dividing the high and low pressure regions and including a plate-like portion over the low pressure region and a short axially extending flange portion of the aforesaid configuration disposed at the low pressure side of the sealing means and including portions closely encircling portions of the bearing means, and a filler plate and resilient means between the filler plate and the platelike portions, and the sealing means including a beaded portion overlying a flange portion.

18. In a rotary hydraulic machine, gear type impeller means, spaced shafts supporting the impeller means, a multi-part housing for said impeller means, bearing means in the housing for supporting said shafts, movable wear plate means for end loading the impeller means and having a first side movably abutting against said first side of said impeller means and a second side spaced from and facing the housing, means including a fluid pressure chamber at the second side of said plate for effecting movement of the wear plate means relative to the impeller means, means including resilient sealing means at the second side of said plate providing high and low pressure areas at the second side of said plate and providing also sealing between the housing parts, passage means connecting said high and low pressure areas to high and low pressure regions, respectively, of said impeller means, an anti-extrusion element having a configuration corresponding generally to that portion of the sealing means dividing the high and low pressure regions and including a platelike portion over the low pressure region and a short axially extending flange portion of the aforesaid configuration disposed at the low pressure side of the sealing means and including portions closely encircling portions of the bearing means, and a filler plate and resilient means between the filler plate and the platelike portions, the sealing means including a beaded portion overlying a flange portion, and the filler plate and platelike portions having aligned openings at the low pressure region.

References Cited by the Examiner

UNITED STATES PATENTS

| | | | |
|---|---|---|---|
| 2,044,873 | 6/36 | Beust | 103—126 |
| 2,682,836 | 7/54 | Orr | 103—126 |
| 2,809,592 | 10/57 | Miller et al. | 103—126 |
| 2,816,510 | 12/57 | Jarvis | 103—126 |
| 2,842,066 | 7/58 | Hilton | 103—126 |
| 3,050,010 | 8/62 | Thrap et al. | 103—126 |
| 3,096,719 | 7/63 | McAlvay | 103—126 |
| 3,174,435 | 3/65 | Sisson et al. | 103—126 |

DONLEY J. STOCKING, *Primary Examiner.*